(12) United States Patent
Fathauer (10) Patent No.: US 9,970,533 B2
(45) Date of Patent: May 15, 2018

(54) SOLENOID REBUILDING METHOD FOR AUTOMATIC TRANSMISSIONS

(71) Applicant: Advanced Powertrain Engineering, LLC, Sullivan, IN (US)

(72) Inventor: Paul Fathauer, Sullivan, IN (US)

(73) Assignee: Advanced Powertrain Engineering, LLC, Sullivan, IN (US)

( * ) Notice: Subject to any disclaimer, the term of this patent is extended or adjusted under 35 U.S.C. 154(b) by 251 days.

(21) Appl. No.: 14/554,662

(22) Filed: Nov. 26, 2014

(65) Prior Publication Data

US 2015/0144202 A1 May 28, 2015

Related U.S. Application Data

(60) Provisional application No. 61/909,751, filed on Nov. 27, 2013.

(51) Int. Cl.
| F16H 61/02 | (2006.01) |
| F16K 31/06 | (2006.01) |
| F16K 27/04 | (2006.01) |
| F16H 61/00 | (2006.01) |

(52) U.S. Cl.
CPC ....... *F16H 61/0251* (2013.01); *F16K 27/041* (2013.01); *F16K 27/048* (2013.01); *F16K 31/0613* (2013.01); *F16H 2061/0062* (2013.01); *Y10T 137/0502* (2015.04); *Y10T 137/86622* (2015.04)

(58) Field of Classification Search
CPC ..... F16H 2057/0068; F16H 2057/0062; F15B 211/655; B23P 6/00
See application file for complete search history.

(56) References Cited

U.S. PATENT DOCUMENTS

| 3,477,055 A | 11/1969 | Herbst |
| 4,160,503 A | 7/1979 | Ohlbach |
| 4,429,459 A | 2/1984 | Lynch |
| 4,678,006 A | 7/1987 | Northman et al. |
| 4,774,976 A | 10/1988 | Janecke |
| 4,783,049 A | 11/1988 | Northman et al. |
| 4,785,848 A | 11/1988 | Lieber |

(Continued)

FOREIGN PATENT DOCUMENTS

| EP | 0797008 | 5/2001 |
| EP | 1574770 | 12/2006 |

(Continued)

OTHER PUBLICATIONS

CA Appln. 2717752, Office Action dated Sep. 2, 2016, 3 pages.

(Continued)

*Primary Examiner* — Christopher Besler
(74) *Attorney, Agent, or Firm* — John V. Daniluck; Bingham Greenebaum Doll LLP (57) ABSTRACT

A method of rebuilding a pressure control solenoid includes uncrimping a housing of the solenoid, and disassembling the solenoid. An original spool valve of the solenoid is removed from a hydraulic bore of the solenoid. The hydraulic bore is reamed such that an inner diameter of the bore is enlarged. A replacement spool valve is inserted into the hydraulic bore. An outer diameter of the replacement spool valve is larger than an outer diameter of the original spool valve.

12 Claims, 9 Drawing Sheets

(56) References Cited

U.S. PATENT DOCUMENTS

| | | | |
|---|---|---|---|
| 4,787,853 A | 11/1988 | Garashi | |
| 4,932,439 A | 6/1990 | McAuliffe, Jr. | |
| 4,947,893 A | 8/1990 | Miller et al. | |
| 4,959,750 A | 9/1990 | Cnyrim et al. | |
| 5,090,109 A | 2/1992 | Haas et al. | |
| 5,093,183 A | 3/1992 | Strunka | |
| 5,121,769 A | 6/1992 | McCabe et al. | |
| 5,127,440 A | 7/1992 | Maas et al. | |
| 5,129,145 A | 7/1992 | Matthews et al. | |
| 5,135,027 A | 8/1992 | Miki et al. | |
| 5,184,644 A | 2/1993 | Wade | |
| 5,217,047 A | 6/1993 | McCabe | |
| 5,449,227 A | 9/1995 | Steinberg et al. | |
| 5,452,948 A | 9/1995 | Cooper et al. | |
| 5,611,372 A | 3/1997 | Bauer et al. | |
| 5,651,391 A | 7/1997 | Connolly et al. | |
| 5,680,883 A | 10/1997 | Gluf | |
| 5,823,070 A | 10/1998 | Taniguchi et al. | |
| 5,823,071 A | 10/1998 | Petrosky et al. | |
| 5,855,229 A | 1/1999 | Gluf, Jr. | |
| 5,887,851 A | 3/1999 | Trzmiel | |
| 5,904,180 A | 5/1999 | Iwamura et al. | |
| 6,019,120 A | 2/2000 | Najmolhoda et al. | |
| 6,038,918 A | 3/2000 | Newton | |
| 6,056,908 A | 5/2000 | Petrosky et al. | |
| 6,087,584 A | 7/2000 | Daoud | |
| 6,109,300 A | 8/2000 | Najmolhoda | |
| 6,155,137 A | 12/2000 | Nassar et al. | |
| 6,161,577 A | 12/2000 | Nassar | |
| 6,164,160 A | 12/2000 | Nassar et al. | |
| 6,164,732 A | 12/2000 | Tominaga et al. | |
| 6,269,827 B1 | 8/2001 | Potter | |
| 6,354,674 B1 | 3/2002 | Iwamoto et al. | |
| 6,450,424 B1 | 9/2002 | Horbelt | |
| 6,653,856 B1 | 3/2003 | Kakiage | |
| 6,544,138 B2 | 4/2003 | True et al. | |
| 6,612,202 B2 | 9/2003 | Thorum et al. | |
| 6,713,685 B1 | 3/2004 | Cotton | |
| 6,715,510 B2 | 4/2004 | Hebert | |
| 6,761,596 B2 | 7/2004 | Kuhbauch et al. | |
| 6,832,632 B1 | 12/2004 | Wallace | |
| 6,894,217 B2 | 5/2005 | Li | |
| 7,051,993 B2 | 5/2006 | Kim et al. | |
| 7,055,549 B2 | 6/2006 | Flynn et al. | |
| 7,086,308 B2 | 8/2006 | Suzuki et al. | |
| 7,104,273 B1 | 9/2006 | Stafford | |
| 7,110,246 B2 | 9/2006 | Tsunooka et al. | |
| 7,220,085 B2 | 5/2007 | Nader et al. | |
| 7,233,503 B2 | 6/2007 | Chen | |
| 7,572,402 B2 | 8/2009 | Roskowski et al. | |
| 7,707,872 B2 | 5/2010 | Herbert et al. | |
| 7,771,144 B1 | 8/2010 | Nader et al. | |
| 7,983,024 B2 | 7/2011 | Harris | |
| 8,387,254 B2 | 3/2013 | Fathauer | |
| 2004/0140443 A1 | 7/2004 | Miyata | |
| 2008/0089044 A1 | 4/2008 | Fathauer | |
| 2009/0217523 A1 | 9/2009 | Johnson et al. | |
| 2011/0088236 A1* | 4/2011 | Fathauer | B23P 6/00 29/402.08 |
| 2013/0160294 A1 | 6/2013 | Fathauer | |
| 2013/0333218 A1 | 12/2013 | Fathauer | |
| 2016/0008932 A1* | 1/2016 | Fathauer | B23P 6/00 29/890.121 |

FOREIGN PATENT DOCUMENTS

| | | |
|---|---|---|
| WO | 2008040944 | 4/2008 |
| WO | 2010033827 | 3/2010 |

OTHER PUBLICATIONS

CA Appln. 2717752, Response filed Mar. 2, 2017, 34 pages.
U.S. Appl. No. 13/772,453, Notice of Allowance dated Apr. 8, 2015, 9 pages.
U.S. Appl. No. 12/905,409, Notice of Allowance dated Oct. 30, 2012, 12 pages.
U.S. Appl. No. 13/856,862, NF Office Action dated Nov. 18, 2015, 14 pages.
Doman, C.T. and R.I. Rice, Jr., "Parts Salvage—When Does it Pay to rebuild Parts?", SAE Sep. 30, 1961.
"How to Repair Solenoids for Ford PMGR, Delco PMGR and Delco SD210/260 Starters," Technical Update 25, 87-254-1 Jan. 31, 1995.
"AW Solenoid Tool Part #31333", Omega Machine & Tool, Inc. Dec. 31, 2020.
"Sonnax Transmission Products Catalog", 2010, Sonnax Industries, vol. 8, pp. 63, 146, 158 Dec. 31, 2010.
Stafford, Maura, "Restoring the Valve Bore: Reamer Technique", Sonnax Industries, pp. 165-166 Dec. 31, 2021.
Gran et. al., "Impact of Microvia-IN-Pad Design on Void Formation," www.sanmina.com (Sanmina Corp.), Jun. 2000. Jun. 1, 2000.

\* cited by examiner

SOLENOID REBUILDING METHOD FOR AUTOMATIC TRANSMISSIONS

CROSS REFERENCE TO RELATED APPLICATION

This application claims the benefit of priority to U.S. Provisional Patent Application Ser. No. 61/909,751, filed Nov. 27, 2013, entitled SOLENOID REBUILDING METHOD FOR AUTOMATIC TRANSMISSIONS, incorporated herein by reference.

FIELD OF THE INVENTION

The invention in one embodiment relates to a fluid control device consisting of several actuators, or solenoids, arranged and secured within a manifold block, hence constituting a solenoid block assembly or module, which is primarily adapted for automatic transmissions used in motor vehicles.

BACKGROUND OF THE INVENTION

Within the field of the automotive aftermarket, there are numerous parts that are considered to be "non-serviceable" items. In such cases, a new part must be purchased at a substantial cost to the end user. In the field of automatic transmissions, one such common device is the solenoid module assembly that controls hydraulic flow and pressure within the transmission. A typical solenoid module consists of a hydraulic manifold and one or more electromechanical solenoids. The hydraulic manifold contains numerous fluid circuit passages that hydraulically communicate with the solenoids. The electromechanical solenoids control either the flow (on/off control) through the passages or regulate pressure within the passages. Typically, the solenoids are electrically connected to a terminal housing that provides for a removable connection to a wire harness, allowing for communication to the powertrain control unit (PCU).

One such assembly is described in U.S. Pat. Nos. 4,687,006 and 4,783,049. In the described invention, a device consisting of five electrically actuated solenoid assemblies are situated on an aluminum manifold block consisting of multiple fluid passageways. The connections for the solenoids consist of round pins that extrude upwards through a printed circuit board (PCB) and are soldered into place. The PCB interconnects to a terminal connector providing communication through a wire harness to the PCU. This particular solenoid module has been used in the Ford E4OD and 4R100 automatic transmission since 1989. It has several well-known failure modes and is a common replacement item. These new modules typically cost $150-200 to the end user. Several companies rebuild these modules by disassembling the unit, cleaning and replacing defective components. A new PCB of similar configuration to the original is soldered into place. A rebuilt unit costs approximately $100 to the end user.

Figure 1:
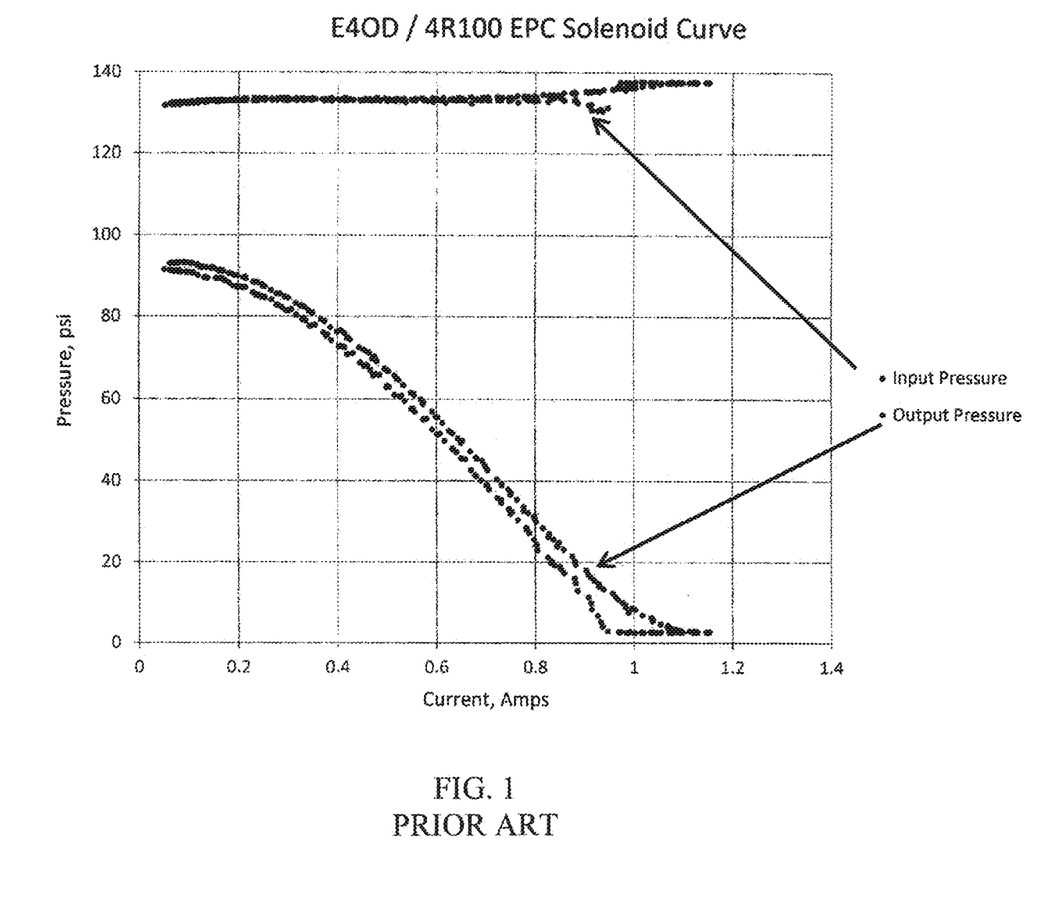
FIG. 1 is a plot of input pressure and output pressure versus electrical current for a typical new pressure control solenoid.

A response curve for a typical solenoid is shown in FIG. 1. Here, the output pressure is shown as the current increases and subsequently decreases.

Figure 2:
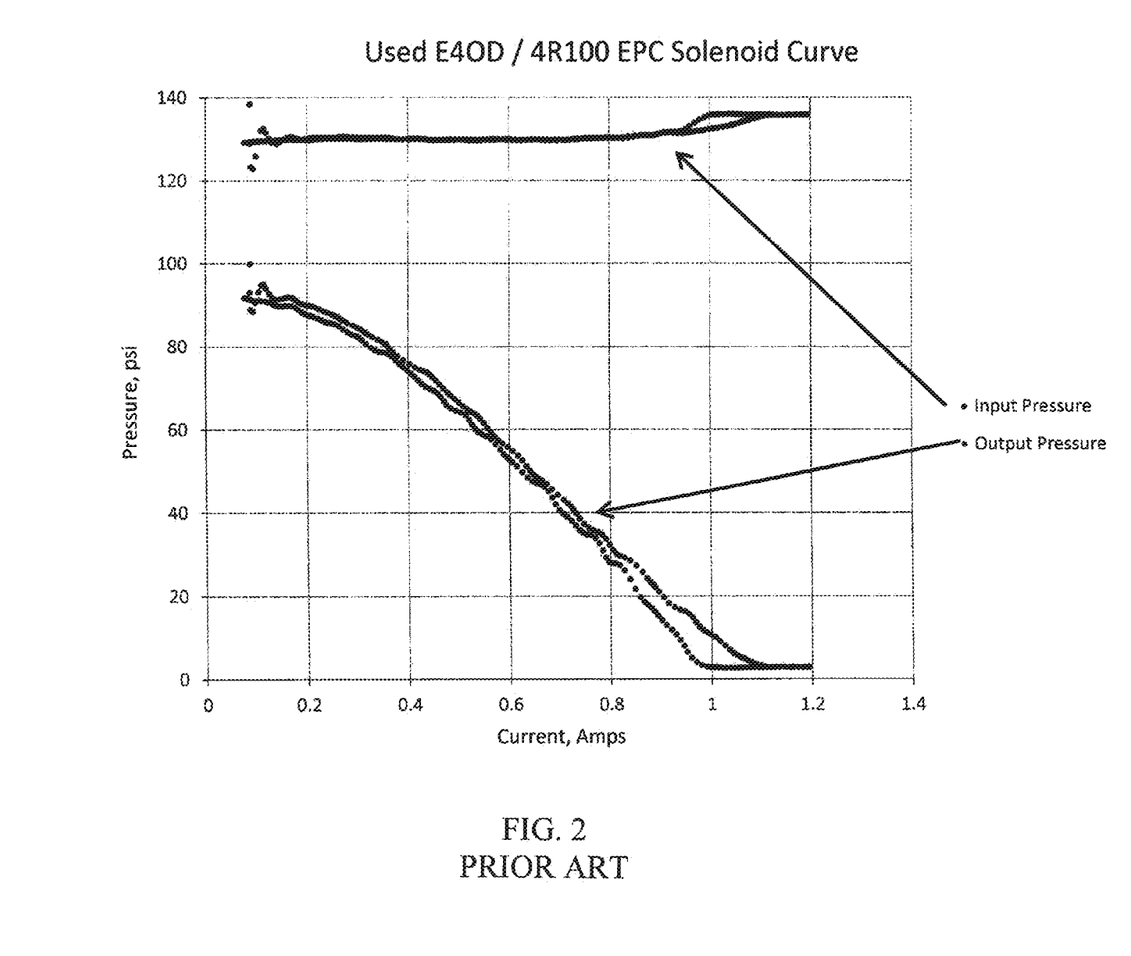
FIG. 2 is a plot of input pressure and output pressure versus electrical current for a typical used or worn pressure control solenoid.

During a typical life cycle of the above described EPC, there are several components that can degrade. However, as background for some of the embodiments of the present invention, the wear in the hydraulic housing and spool valve will be discussed. The mechanical interface between spool valve and the bore of the hydraulic housing is important to the operation of the solenoid. The clearance between the spool valve and bore should be within certain operational limits. If the clearance is too small, the valve will not operate smoothly and can become encumbered by contamination in the fluid. If the clearance is too large, the valve will leak and the hydraulic operation can become erratic. A typical response curve for a used solenoid is shown in FIG. 2.

Figure 3:
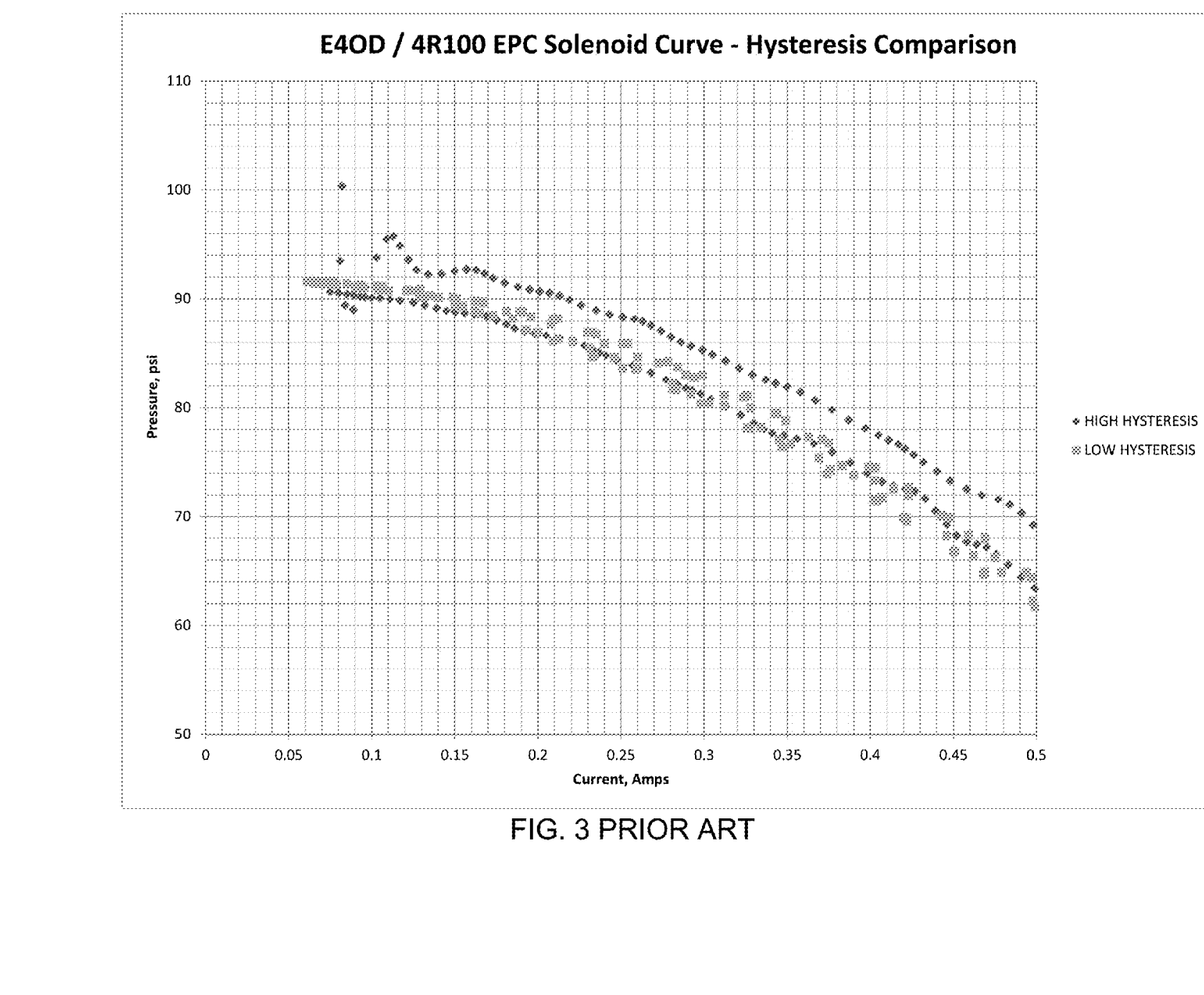
FIG. 3 is a plot of output pressure versus electrical current illustrating a case of high hysteresis for a typical used or worn pressure control solenoid and a case of low hysteresis for a typical new pressure control solenoid.

A common problem with certain solenoid designs, such as the E4OD/4R100 EPC, is inconsistent output response between increasing current and decreasing current, commonly referred to a hysteresis. A comparison of a low and high hysteresis is shown in FIG. 3 (for illustrative ease, the graph is focused in the low amperage range). Ideally, the decreasing output pressure curve would follow the same curve as the increasing output pressure (i.e., one curve would describe the increasing and decreasing current response). In the case of high hysteresis as shown in FIG. 3, the increasing and decreasing current response shows a wide discrepancy (wide band). For the low hysteresis, the difference between the two curves is close (narrow band).

There are several causes of the hysteresis, which can include contamination buildup in the solenoid, improper valve clearance, damage to the spool valve/hydraulic bore. Another source is mechanical "slop", which is inherent to the solenoid design. This mechanical "slop" is from slight movement of the adjustment end of the solenoid. In the depicted solenoid, this movement can be from loose threads in the adjustment pieces or from movement of the backing plate to which the adjustment pieces are affixed. There are numerous ways to remove the mechanical movement in the threads, including using thread tape or sealant, or distorting the threads. The manufacturer of the solenoid may weld the adjustment pieces.

SUMMARY

A method of the present invention according to one embodiment provides for repair of the hydraulic functioning of a solenoid. A further method is described that allows for controlling the mechanical slop in the solenoid, thus improving the hysteresis of the solenoid.

In a solenoid block assembly, if at least one component fails, the whole module is affected and deemed defective. However, the present invention also may be applied to individual solenoids that are not arranged and secured within a solenoid block assembly or module. For example, the present invention may be applied to actuators and solenoids that are individually inserted and secured in a valve body that is primarily and generally adapted for automatic transmissions.

Various embodiments of the invention comprises, in one form thereof, a method of rebuilding a pressure control solenoid, including uncrimping a housing of the solenoid, and disassembling the solenoid. An original spool valve of the solenoid is removed from a hydraulic bore of the solenoid. The hydraulic bore is reamed such that an inner diameter of the bore is enlarged. A replacement spool valve is inserted into the hydraulic bore. An outer diameter of the replacement spool valve is larger than an outer diameter of the original spool valve.

Various embodiments of the invention comprises, in another form thereof, a method of rebuilding a pressure control solenoid, including removing an original spool valve of the solenoid from a hydraulic bore of the solenoid. The hydraulic bore is machined such that an inner diameter of the bore is enlarged. A replacement spool valve is inserted into the hydraulic bore. An outer diameter of the replacement spool valve is approximately between 0.01 mm and 0.06 mm less than the inner diameter of the hydraulic bore after the machining step.

Various embodiments of the invention comprises, in yet another form thereof, a rebuilt pressure control solenoid including components of an original solenoid. The rebuilt pressure control solenoid includes an original hydraulic body including a modified hydraulic bore that has been machined such that a modified inner diameter of the bore is larger than an original inner diameter of the bore that existed when the original solenoid was previously in operation. A replacement spool valve is disposed in the modified hydraulic bore. An outer diameter of the replacement spool valve is larger than an outer diameter of an original spool valve that was in the original solenoid when the original solenoid was previously in operation.

An advantage of the present invention is that a rebuilt pressure control solenoid has a reduced level of hysteresis in its output pressure in response to varying current, e.g., increasing and then subsequently decreasing current.

Another advantage of the present invention is that a rebuilt pressure control solenoid has a reduced level of mechanical slop.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

FIG. 6b is a side view of the shim of FIG. 6a.

DETAILED DESCRIPTION OF THE PREFERRED EMBODIMENTS

For the purpose of promoting an understanding of the principles of the present invention, reference will now be made to the embodiment illustrated in specific language contained herein. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more tests that were performed. It is understood that such examples are by way of example only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Figure 4:
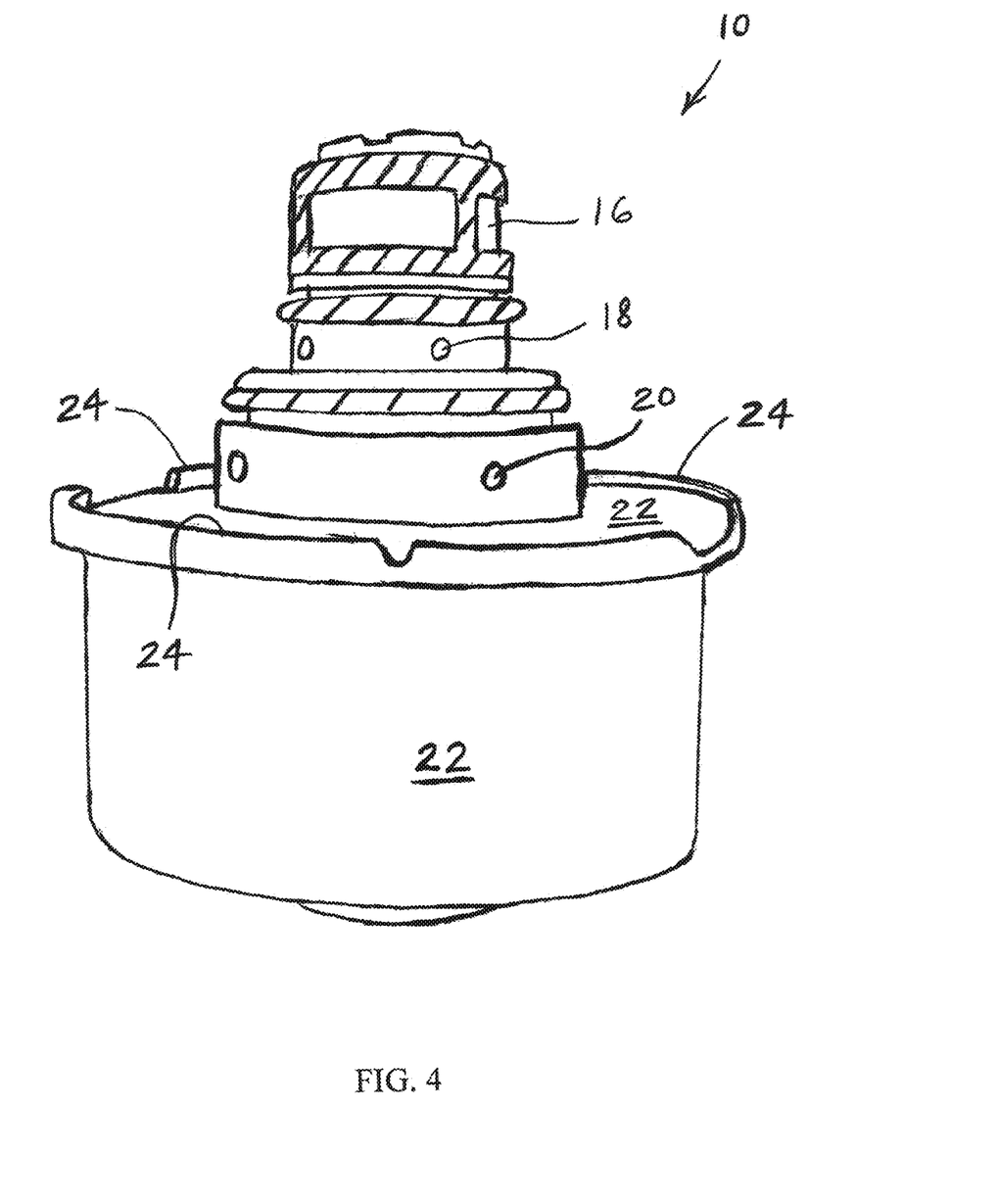
FIG. 4 is a perspective view of one embodiment of a pressure control solenoid that may be utilized in conjunction with a method according to one embodiment of the present invention.
Figure 5:
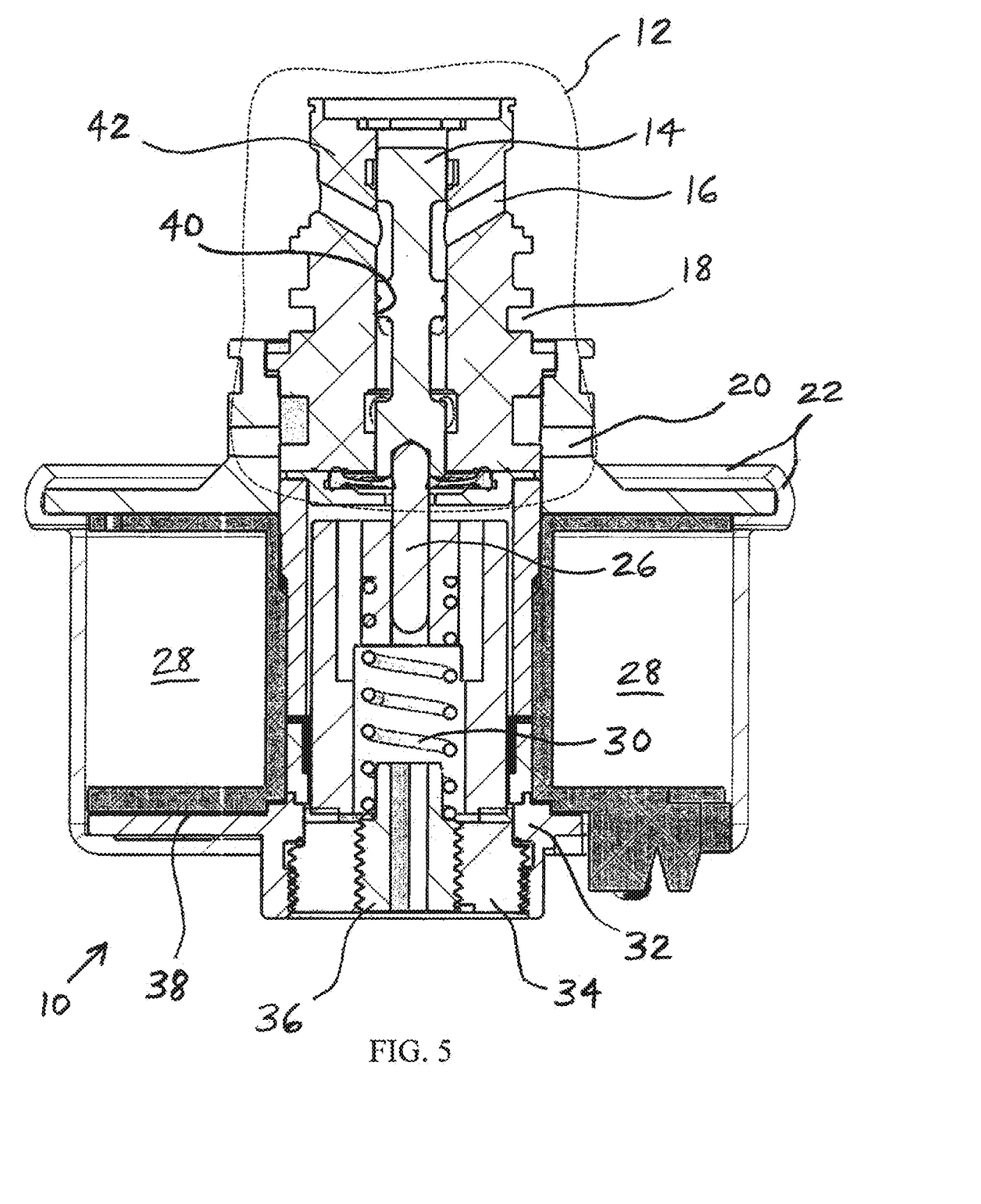
FIG. 5 is a cross-sectional view of another embodiment of a pressure control solenoid that may be utilized in conjunction with a method according to one embodiment of the present invention.

For illustrative purposes of the application of various embodiments of the present invention, a method for rebuilding the pressure control solenoid for the E4OD/4R100 will be described. The pressure control solenoid, herein referred to as the EPC 10, is shown in FIG. 4. A cross-sectional view of the EPC 10 is shown in FIG. 5. EPC 10 includes a hydraulic housing 12, a spool valve 14, an unregulated input port 16, a regulated output port 18, an exhaust port 20, a two-piece solenoid housing 22 connected together by a circumferential crimp 24 (FIG. 4), a plunger 26, a coil 28, a spring 30, a backing plate 32, a threaded bushing 34, a set screw 36, a shim 38, and a hydraulic bore 40 in a hydraulic body 42. Bore 40 receives spool valve 14.

As shown in FIG. 5, hydraulic pressure is regulated from an input pressure, Pi, to an output pressure, Po by controlling the position of spool valve 14. The position of spool valve 14 is motivated by the force balance of the force of spring 30 and electromagnetic force from current flow in electrical coil 28. When there is no current flow in coil 28, the output pressure is at the maximum output and is controlled solely from the force of spring 30. At the maximum current flow, the output pressure is at the minimum output (zero).

An overview of the inventive rebuilding process is as follows. The solenoid, which has been in use or in operation in the field, is returned to the manufacturer or to a rebuilding shop, for example, for rebuilding. There the solenoid may be opened by mechanically reversing the crimped section of solenoid housing 22. That is, crimp 24 may be opened. The solenoid is disassembled and various components are cleaned and inspected, or replaced with new components. The hydraulic housing 12 is repaired by reaming hydraulic bore 40 to a larger diameter. A new, oversized spool valve 14 is provided. The solenoid's components are reassembled. An optional, conforming shim 38 is placed to ensure proper interference of the components. The solenoid assembly is again crimped, and the solenoid is calibrated to ensure proper operation in the vehicle. The described method provides for solenoid operation performance in a rebuilt used solenoid that is similar to or better than the operation performance of a new solenoid. Furthermore, by replacing the non-adjustable adjustment pieces, the end user can make adjustments to the solenoid to fit his preferences.

There are various methods for opening the solenoid. In one such method, sections of the crimp 24 are mechanically removed (e.g., cutting or grinding) and the solenoid is pulled apart by pulling the two pieces of solenoid housing 22 apart. Another method would be to pry the crimp 24 back in small circumferential sections with a tool (not shown). For some embodiments of the invention, an expanding tool is placed between the solenoid housing 22 and the crimp 24. A second section of the tool is pressed into the expanding section causing the crimp 24 to expand open.

The solenoid is hydraulically restored by enlarging the inside bore diameter of hydraulic bore 40 of the original hydraulic body 42 via machining and installing a new oversized spool valve 14 with a diameter of $OD_{1b}$, where $OD_{1b} > OD_{1a}$, where $OD_{1a}$ is the original diameter.

One embodiment of a method of repair is via machining the housing with one or more reamers, such as a primary reamer and a secondary reamer. The reamers may or may not be piloted. A secondary, finishing reamer may be used for producing the desired surface finish and achieving a desired level of smoothness by removing minimal material. The reamers can be constructed of high speed steel (HSS) or carbide and may have two or four flutes.

An example diameter dimension for bore 40 is $ID_{1b}$=4.76 mm; however, other sizes are contemplated within the scope of the invention. A new spool valve 14 is installed with an example diameter dimension of $OD_{1b}$=4.73 mm. In one embodiment the diameter for the reamed bore 40 $ID_{1b}$ is approximately between 0.01 mm and 0.06 mm larger than the diameter $OD_{1b}$ of the new spool valve 14, and in another embodiment the diameter for the reamed bore 40 $ID_{1b}$ is approximately between 0.02 mm and 0.04 mm larger than the diameter $OD_{1b}$ of the new spool valve 14; however other sizes are contemplated within the scope of the invention.

The spool valve 14 may have a surface hardness of 58-62 on the Rockwell C scale (HRC). The valve 14 can be constructed of 4140 grade steel, 12L14 grade carbon steel or 41L40 grade steel. A valve 14 with a lower surface hardness may also be used. In one embodiment, the surface finish (Ra) on the outside surfaces is 0.8 micrometers (32 micro inches) or less. That is, a level of surface finish of a radially outwardly facing surface of valve 14 is less than 0.8 micrometers. In another embodiment of the invention, a valve 14 constructed from 6061 or 7075 aluminum may be used. The valve 14 may also be coated with a hard coat anodized coating to provide a surface hardness of 60-70 HRC. This coating may or may not be ground afterwards to maintain the critical dimensions of the spool valve 14. There are several advantages to this embodiment of the invention. First, aluminum can have superior thermal properties as compared to a steel valve. Second, the dynamic response of an aluminum valve can be faster than that of a steel valve.

Other internal components of the solenoid are cleaned and inspected. In the present example, the coil 28 is visually inspected and tested electrically to verify integrity of the coil 28. Also in the present example, a new backing plate 32, outer and inner adjustment pieces are provided. Also, a new spring 30 and brass washer may be provided. The solenoid components are re-assembled.

In order to improve (e.g., reduce) the hysteresis of solenoid pressure output, a conformable shim 38 may be placed between the coil 28 and the backing plate 32. However, it is possible within the scope of the invention to place the shim at any of the interfaces between components in the vertical stackup, so long as the shim may provide a slight interference fit between parts in the vertical stackup in a direction defined by a longitudinal axis of the replacement spool valve. This conformable shim 38 may prevent any assembly slop that would allow free movement of the backing plate 32. Ideally, the material must have a proper compressive modulus that allows the shim 38 to compress and not deform any of the internal components. In addition, the material should not shrink or experience a decrease in modulus from heat and exposure to transmission fluid. In one embodiment, polytetrafluoroethylene (PTFE) is used. However, it is also contemplated that other thermoplastics such as low density polyethylene (LDPE), high density polyethylene (HDPE) or ultra-high molecular weight polyethylene (UHMW) may be used. In other embodiments, other polymers such as Viton or Silicone are used.

Figure 6A:
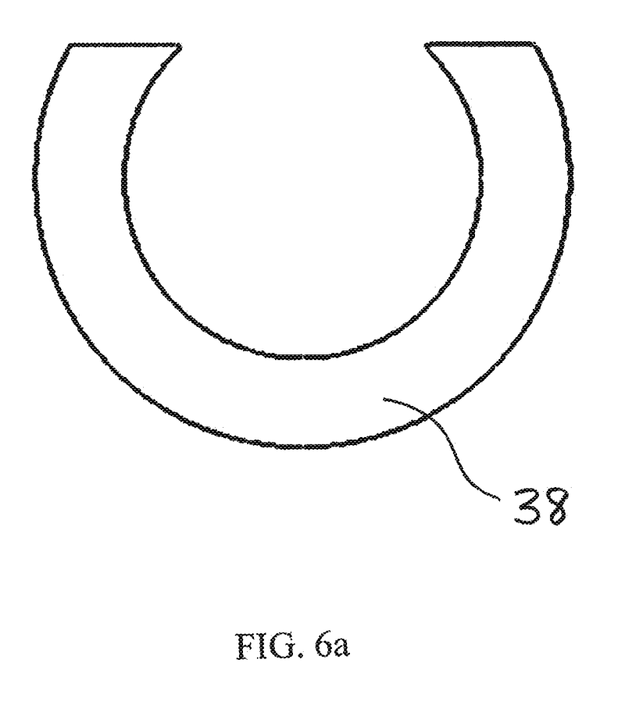
FIG. 6a is a plan view of the shim of the pressure control solenoid of FIG. 5.
Figure 6B:
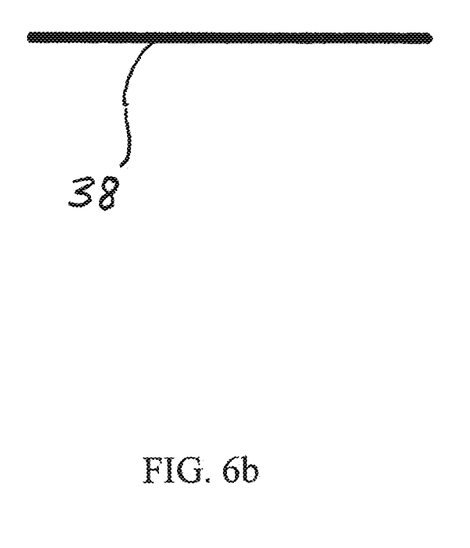

One embodiment of shim 38 is shown in FIGS. 6a-b. Shim 38 is shown to be in the form of about three quarters of a circular ring. Thus, shim 38 may be generally U-shaped or horseshoe-shaped. However, other shapes and sizes of the shim may be used based on the configuration of the solenoid.

The solenoid components are compressed together and the solenoid housing 12 is crimped closed. The outer adjustment component (threaded bushing 34) and inner adjustment component (set screw 36) are adjusted to match the factory calibration of the new solenoid. For the outer adjustment component, four small indentations are pressed around the outer circumference. This introduces an interference fit between the outer thread of the threaded bushing 34 and the inner thread of the backing plate 32. A spanner type wrench may be used for adjustment. For preventing the movement of the backing plate 32, a certain amount of interference may be designed into the assembly. Thus, when the solenoid housing 12 is crimped, the backing plate 32 is pulled tight with the assembly. However, the interference can be hard to control within tight limits because of the tolerances of each component. Therefore, for some percentage of the solenoids, this interference may either be too much or none at all.

Figure 7:
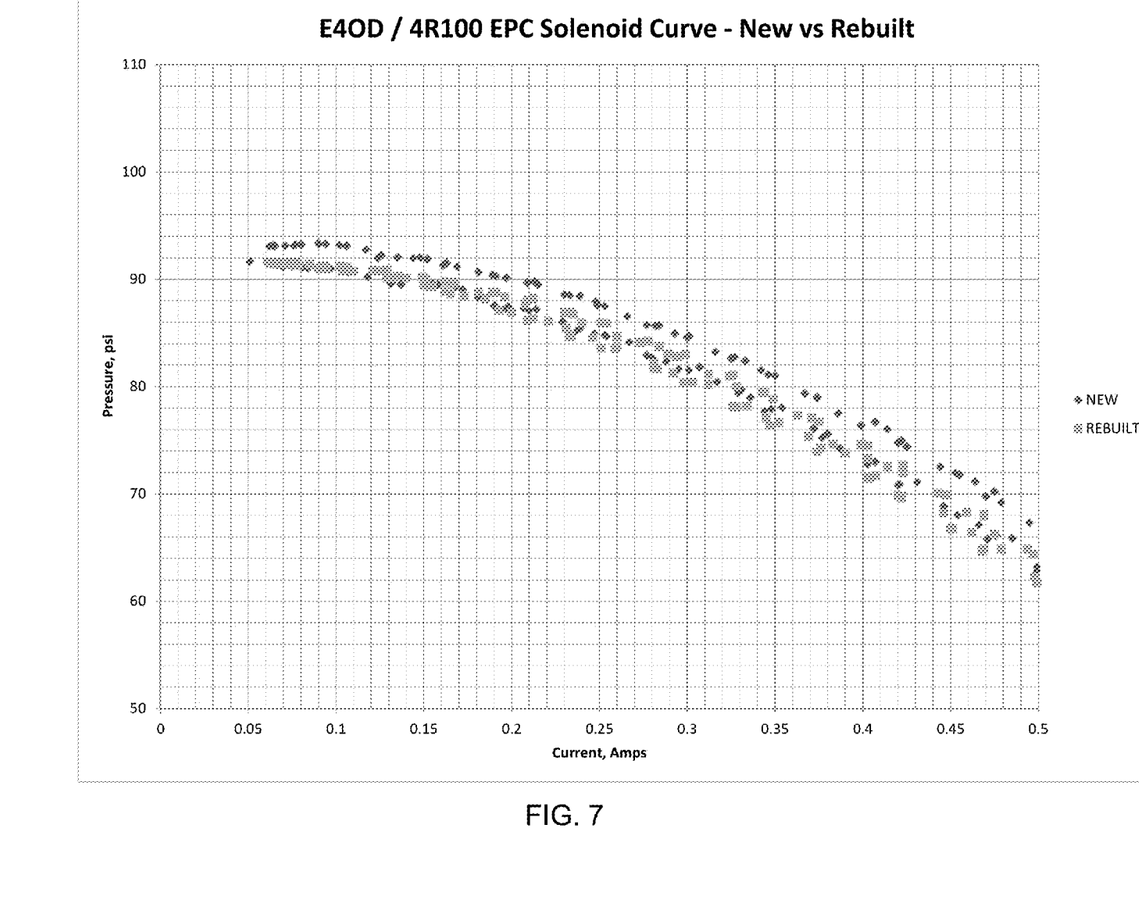
FIG. 7 is a plot of output pressure versus electrical current for a typical new pressure control solenoid and a used pressure control solenoid that has been rebuilt according to one embodiment of a method of the present invention.

For the set screw 36, a PTFE thread tape is utilized to create an interference fit between the thread of the set screw 36 and the inside thread of the threaded bushing 34. The improvement to the hysteresis of the rebuilt solenoid is compared to a new solenoid is shown in FIG. 7. That is, as FIG. 7 illustrates, the hysteresis of the solenoid that has been rebuilt according to the methods disclosed herein is even less than that of a new solenoid.

Figure 8:
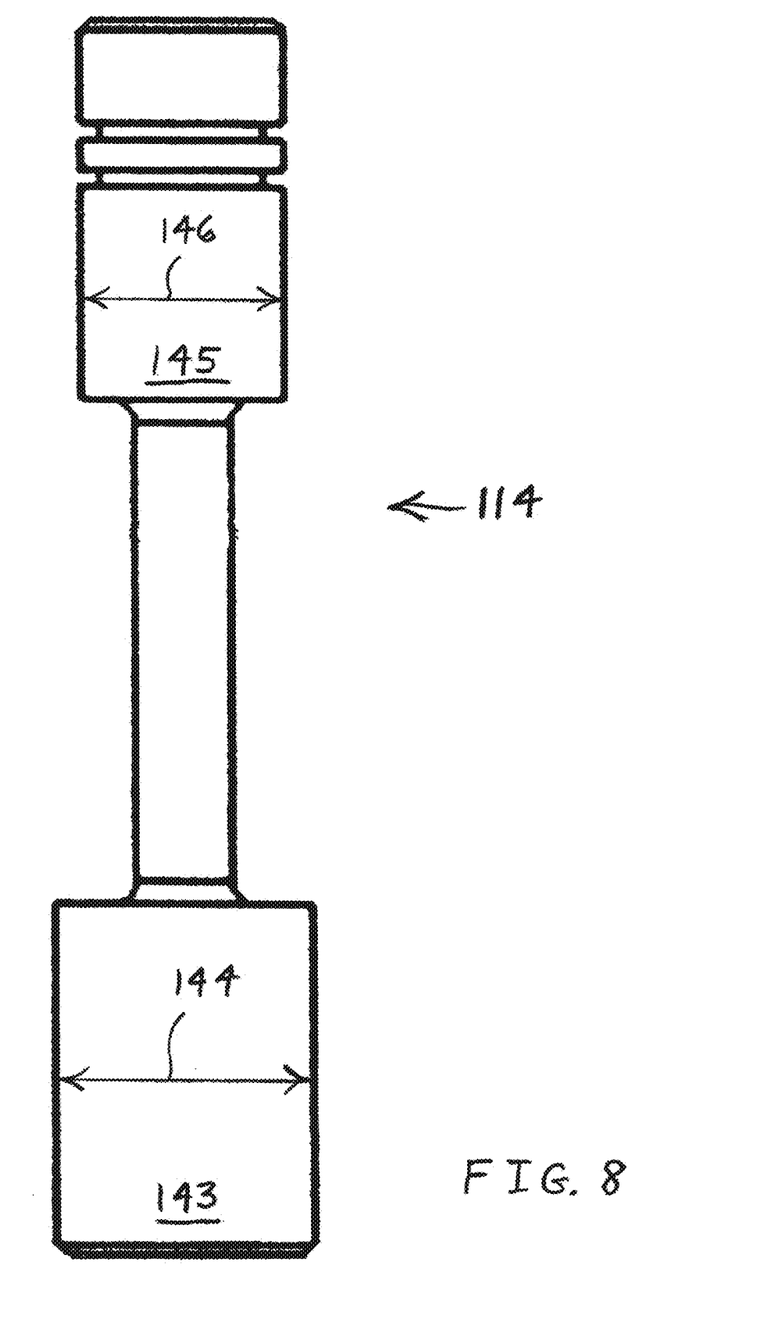
FIG. 8 is a front view of another embodiment of a spool valve that may be incorporated into a rebuilt pressure control solenoid of the present invention.
Figure 9:
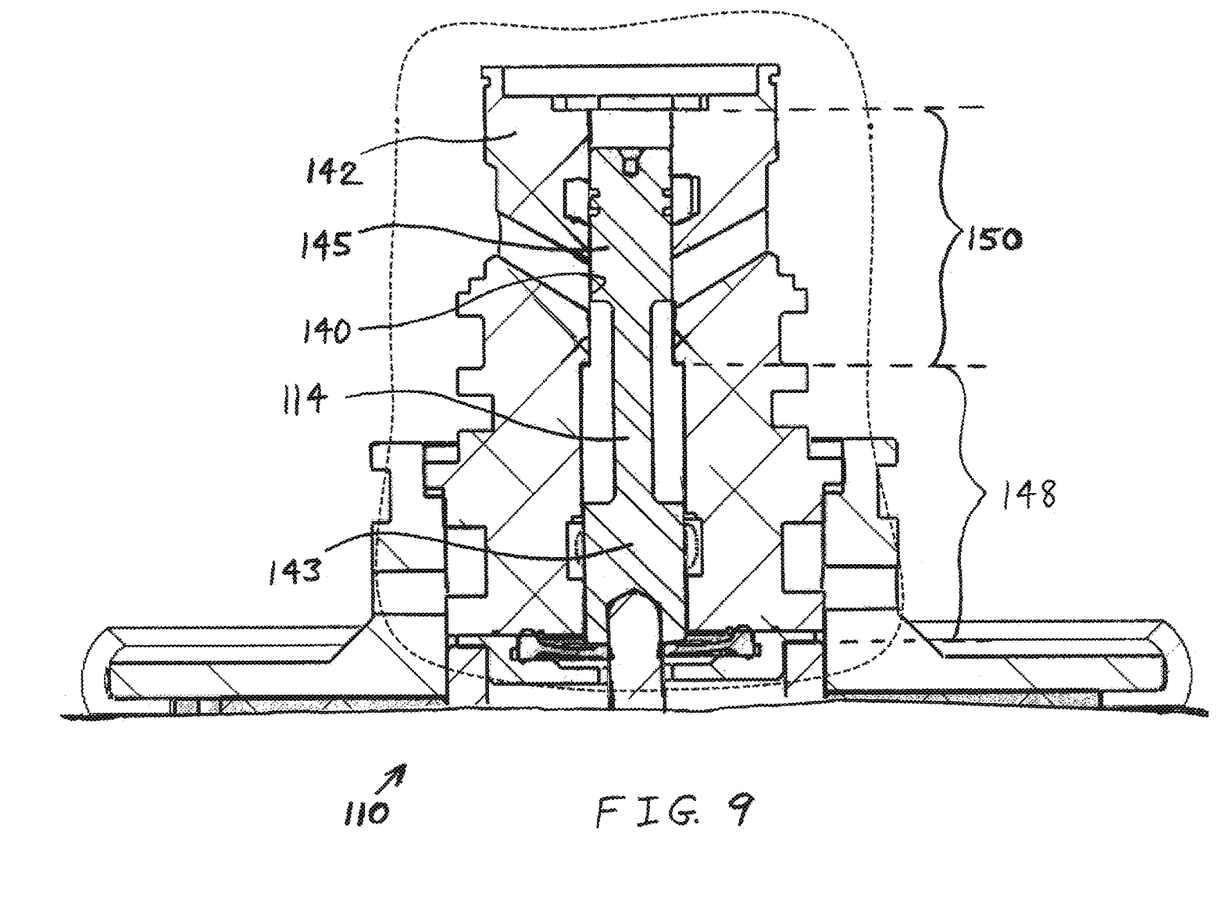
FIG. 9 is a fragmentary, cross-sectional view of another embodiment of a pressure control solenoid that may be utilized in conjunction with a method according to one embodiment of the present invention, and including the spool valve of FIG. 8.

In the embodiment illustrated in FIG. 4, the spool valve may have only one diameter. However, the present invention is also applicable to repairing or rebuilding solenoids having spool valves with multiple diameters. FIG. 8 illustrates an example of one such spool valve 114 having one section 143 with a larger diameter 144 and another section 145 with a smaller diameter 146. In one embodiment, larger diameter 144 is 0.2257 inch, and smaller diameter 146 is 0.1821 inch. FIG. 9 illustrates spool valve 114 incorporated into a rebuilt EPC 110. EPC 110 includes a hydraulic housing 142 having a hydraulic bore 140 with a wider section 148 and a narrower section 150 for receiving and accommodating the two different diameters of spool valve 114. In one embodiment, the diameter of wider section 148 is approximately between 0.02 mm and 0.04 mm larger than diameter 144; and the diameter of narrower section 150 is approximately between 0.02 mm and 0.04 mm larger than diameter 146. In another embodiment, the diameter of wider section 148 is approximately between 0.01 mm and 0.06 mm larger than diameter 144; and the diameter of narrower section 150 is approximately between 0.01 mm and 0.06 mm larger than diameter 146.

In the rebuilding process, one or both of sections 148, 150 of bore 140 may have been machined to enlarge its diameter as compared to the diameter(s) of the original hydraulic bore of the original (e.g., OEM) solenoid. During the rebuilding, two different reamers of two different widths may be used to machine sections 148, 150, respectively. If additional secondary finishing reamers are also employed, there may be four different reamers used in the rebuilding process. However, in another embodiment, one stepped reamer is used to machine both of sections 148, 150 of bore 140. The stepped reamer has a shank, a wider machining section having one end directly attached to the shank, and a narrower machining section directly attached to the other end of the wider machining section. Each of the wider machining section and the narrower machining section may have six flutes. Regardless of whether one or both of sections 148, 150 are enlarged by machining, a new spool valve 114 may be selected or created having appropriate diameters 144, 146 that are sized to be received in sections 148, 150, respectively.

In the above embodiments, a solenoid having a single diameter hydraulic bore has been described as being rebuilt to still have a single diameter hydraulic bore; and a multi-diameter hydraulic bore has been described as being rebuilt to still have a multi-diameter hydraulic bore; However, it is to be understood that the rebuilding process of the invention may be applied to rebuild a single diameter hydraulic bore into a multi-diameter hydraulic bore; or to rebuild a multi-diameter hydraulic bore into a single diameter hydraulic bore, as will be apparent to and easily understood by those of skill in the art.

A benefit of some embodiments, when the original adjustment components are welded (as in the case of the E4OD/4R100 EPC), is that the EPC can be adjusted in the field. Since the EPC for the E4OD/4R100 affects the shifting of the transmission, turning the inner adjustment (set screw 36) clockwise will increase the firmness of the shifts. Conversely, turning the set screw 36 counter-clockwise will result in softer shifts. Therefore, the end user can make adjustments to suit his individual preferences. For example, an owner of a truck might prefer a firmer shift and high pressures, and an owner of a luxury car might prefer a softer shift and low pressures.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A method of rebuilding a used solenoid from an automatic transmission, comprising:
    uncrimping a housing of the used solenoid;
    disassembling the used solenoid;
    removing an original spool valve of the used solenoid from a hydraulic bore of the used solenoid;
    reaming the hydraulic bore such that an inner diameter of the bore is enlarged; and
    inserting a replacement spool valve into the hydraulic bore, an outer diameter of the replacement spool valve being larger than an outer diameter of the original spool valve;
    placing a shim within the housing in an interference fit with a coil of the solenoid; and
    replacing an original backing plate, threaded brushing, and set screw of the solenoid with a new backing plate, threaded bushing, and set screw.

2. The method of claim 1, which further comprises reassembling the solenoid.

3. The method of claim 2, wherein said reassembling includes re-crimping the housing.

4. The method of claim 1, wherein the interference fit is in a direction defined by a longitudinal axis of the replacement spool valve.

5. The method of claim 1, wherein the shim is formed of a polymer material.

6. The method of claim 1, which further comprises calibrating the solenoid after said inserting.

7. The method of claim 1, wherein said reaming is performed with a reamer that is piloted.

8. The method of claim 7, wherein said reamer comprises a primary reamer, said reaming also being performed with a secondary finishing reamer for producing a desired level of surface finish.

9. The method of claim 1, wherein a level of surface finish on a radially outwardly facing surface of the replacement spool valve is less than 0.8 micrometers.

10. The method of claim 1, wherein said inner diameter of the reamed hydraulic bore is approximately between 0.02 mm and 0.04 mm larger than the outer diameter of the replacement spool valve.

11. The method of claim 1, which further comprises making a plurality of spaced indentations around an outer circumference of a threaded bushing of the solenoid to produce an interference fit of an outer thread of the threaded bushing and an inner thread of a backing plate of the solenoid.

12. The method of claim 1, which further comprises placing PTFE thread tape on a set screw of the solenoid to produce an interference fit of a thread of the set screw and an inner thread of a threaded bushing of the solenoid.

\* \* \* \* \*